June 28, 1960

M. R. ABATEMARCO 2,942,781

STANDARD DATA ANALYZER

Filed May 31, 1955

INVENTOR.
MICHAEL R. ABATEMARCO
BY Charles P. Boberg

ATTORNEY

June 28, 1960 M. R. ABATEMARCO 2,942,781
STANDARD DATA ANALYZER
Filed May 31, 1955 2 Sheets-Sheet 2
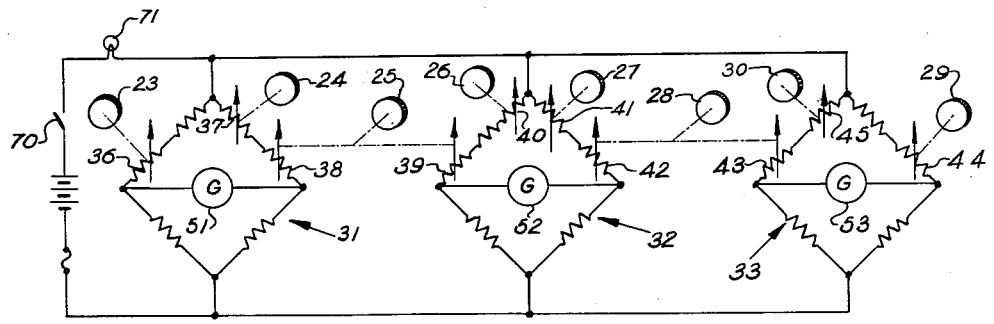
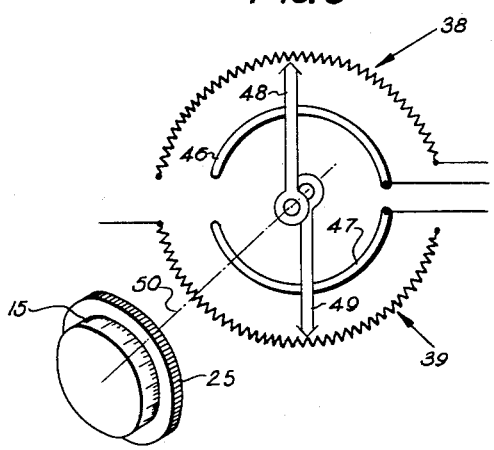
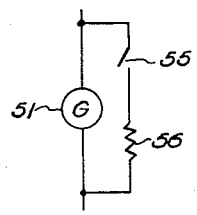
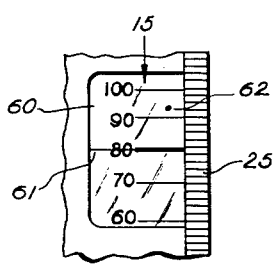
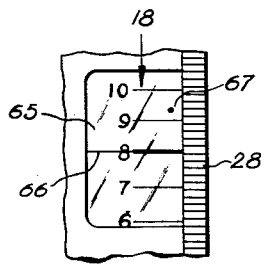
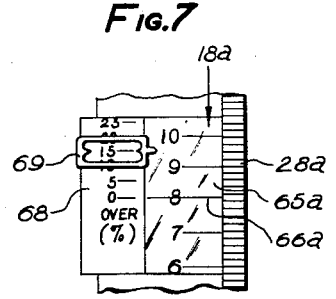
INVENTOR.
MICHAEL R. ABATEMARCO
BY Charles P. Boberg
ATTORNEY

United States Patent Office 2,942,781
Patented June 28, 1960

2,942,781

STANDARD DATA ANALYZER

Michael R. Abatemarco, Freeport, N.Y., assignor to Burroughs Corporation, Detroit, Mich., a corporation of Michigan Filed May 31, 1955, Ser. No. 512,006

3 Claims. (Cl. 235—179)

This invention relates to calculating and analyzing devices which are adapted to utilize data obtained from standard tables to determine optimum operating conditions.

The principles of this invention may be applied very effectively to machine tool operations. It has been customary in the past to determine the optimum speeds and feed rates of machine tools for given operations by cut-and-try methods utilizing longhand calculations, slide rules or nomograms. These conventional methods have proved to be cumbersome, inflexible and subject to error. One reason why they are unsatisfactory is that the speeds and feed rates which may be determined by these computational techniques do not always correspond to the fixed speeds and feed rates that are available in standard machine tools. Often it becomes necessary to make repeated calculations in order to obtain results that are consistent with the practical requirements. Also, there may be instances in which one desires to know the effect that a change in the material, type of finish, choice of cutter or machine tool operation will have upon the time required for performing an operation. Conventional procedures such as those mentioned above are not well adapted to handle these complex problems.

An object of the present invention is to provide an improved data analyzing means which will enable one to solve problems of the aforesaid type far more readily and with greater regard to the limitations encountered in practice.

Another object is to provide an improved data analyzer by means of which optimum solutions that are consistent with practical operating conditions can be obtained quickly, conveniently and accurately.

A further object is to provide a standard data analyzer that can be operated readily by inexperienced personnel with only a small amount of training.

A still further object is to provide a standard machining data analyzer whereby the computed values of machine speeds and feed rates can be brought easily and conveniently into line with practical values.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a diagram of certain electrical circuits utilized in this apparatus.

Figure 1:
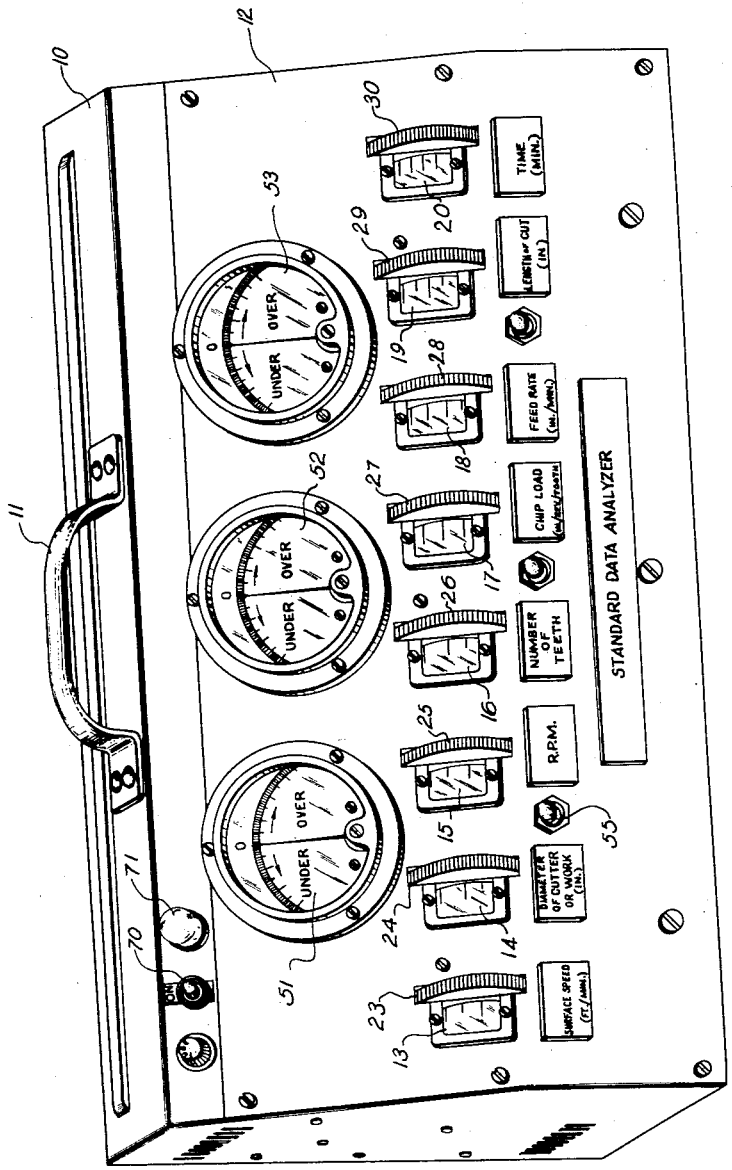
Fig. 1 is an isometric view of a data analyzing apparatus in which the principle of the invention is embodied.

Fig. 3 schematically illustrates a variable resistor unit employed in the apparatus.

Fig. 4 is a partial diagram of a sensitivity control.

Figs. 5 and 6 are fragmentary views of certain dial structures in the apparatus.

Fig. 7 illustrates a modified form of dial structure.

GENERAL DESCRIPTION

The invention will be described with particular reference to machine tool operations such as lathe turning and milling, which will serve as examples for illustrating the uses to which the invention may be put. It will be obvious to those skilled in the art, however, that the principle of the invention may be applied also to operations such as planning, broaching, grinding, boring and many others.

All of these machining problems involve certain basic factors or parameters, namely, the amount of material to be removed from the work, the recommended values of the relative surface speed and feed rate as obtained from tables of standard data, and the practical values of speed and feed rate for which a given machine tool is designed. Usually one desires to know the amount of time required to perform a specified operation, but in other cases the time may be a predetermined quantity, and the problem consists of selecting the other parametric values in accordance therewith.

In a machine tool such as a lathe or milling machine, for example, the fundamental relationship among the various parameters may be expressed as follows:

$$T = \frac{L}{F}$$

where

T = time
L = length of cut
F = feed rate

The value of F may be expressed by the following equation:

$$F = R \cdot N \cdot C, \text{ where}$$

R = rotary speed of work or cutter
N = number of teeth on cutter
C = chip load per tooth per revolution The value of R is given by the equation:

$$R = \frac{S}{D\pi}$$

S = relative surface speed of cutter and work
D = diameter of work or cutter

The chief difficulty encountered in solving problems of this character is to make certain that the selected values of R (rotary speed) and F (feed rate) will coincide respectively with practical values of rotary speed and feed rate that are available in the given machine tool, and that the selected values of S (surface speed) and C (chip load) will be consistent with the recommended surface speeds and chip loads as given in standard tables. Good machining practice allows a certain deviation over the recommended values of S and C where necessary, and one of the features of this invention is the provision of means whereby the respective values of the surface speed and chip load can very conveniently be varied up to but not above their acceptable limits in the course of arriving at the desired rotary speed and feed rate settings for the particular machine tool which is being employed. This novel feature enables one to take advantage of predetermined allowable increases of standard parametric values without resorting to the cumbersome trial-and-error techniques used in conventional practice, and it thereby also obviates the common tendency or possibility of operating considerably below said values with resultant loss of efficiency. This particular feature will be disclosed in greater detail hereinafter.

In the form of the invention illustrated herein (see Figs. 1 and 2), several Wheatstone bridge circuits are employed to handle different but related parts of the same problem. For instance, one Wheatstone bridge has variable elements which are adapted to be set in accordance with the following closely related factors:

(1) Surface speed at the periphery of the rotating cutter or work (selected from a table of recommended values in accordance with the choice of material, finish and/or type of tool, and the type of machine operation to be employed).

(2) Diameter of cutter or work.

(3) Rotary speed of cutter or work, in revolutions per minute (r.pm.).

Where the r.p.m. value obtained as a result of balancing the first bridge does not coincide exactly with one of the standard speeds available in the selected machine tool, but nevertheless comes within a given range of tolerance as indicated by a suitable index on the r.p.m. dial, the r.p.m. dial then is reset to the nearest available standard figure. This is done without resetting the "surface speed" dial, since it can be assumed that the surface speed will remain within a permissible range of values so long as the new r.p.m. setting fulfills that condition. When the r.p.m. dial setting is corrected to an actual machine tool value, the balance indicator of the first bridge network then will point to an "over" or "under" indication (depending upon the sense in which the bridge is unbalanced) as an aid to analysis.

The r.p.m. setting of the first bridge automatically affects the "balance" of the second Wheatstone bridge, wherein there are variable elements adapted to be set according to the following factors:

(4) Number of teeth on the cutter.

(5) Chip load, or amount of material removed by each tooth of the cutter during each of its revolutions. (This is selected from a table of recommended values in accordance with the choice of material, finish and/or type of tool, and the type of machine operation to be employed.)

(6) Feed rate of the material relative to the cutter.

In certain machine operations, such as milling operations or operations which employ hydraulic feed mechanisms, the feed rate is selected independently of the rotary speed of the cutter or work. Where this is the case, and the feed rate obtained by balancing the second bridge does not coincide with one of the standard feeds available on the selected machine tool, the feed rate dial then is reset to a standard figure within a range of tolerance indicated by a suitable dial index. It can be assumed under these conditions that the chip load for the new feed rate will come within the permissible limits so that the "chip load" dial is not reset. When the feed rate dial setting is corrected in the manner just described, the balance indicator of the second bridge network will register "over" or "under" according to the sense of the resulting unbalance, thereby aiding the analysis.

A third Wheatstone bridge contains adjustable elements which are calibrated according to the following factors:

(7) Length of cut.

(8) Time per cut.

The feed rate setting of the second bridge automatically affects the "balance" of the third bridge. Thus, the setting of the time dial in this instance is the end result of numerous multiplications and divisions of factors which are performed by setting the elements of the three bridges into their approximately balanced relationships, and it represents an optimum solution in which due regard is given to the practical limits of speeds and feeds.

Occasions may arise in which one desires to alter the values of one or more individual factors or parameters such as the surface speed, diameter, r.p.m., number of teeth, chip load, feed rate, or length of cut to determine their respective effects upon the end result. This may be accomplished readily by manipulation of the dials associated with these factors. Bridge balances are restored quickly and easily after each change of dial setting, whereas if one were solving longhand equations or performing slide rule computations, the process would not be so convenient and optimum solutions moreover would not be obtained. If, in addition to this, one considers the complications involved in matching the computed speeds or feed rates to the available fixed values of these factors or parameters, the prior conventional practices are readily seen to be outmoded by the new principle disclosed herein, which resolves the former cumbersome techniques into simple manipulations.

As already mentioned, it is not necessary that "time" be the end result of the problem in all cases. If desired, the time dial can be set to a predetermined value and the various other dials adjusted accordingly to fulfill the stated conditions. Here again, the novel arrangement of the bridge circuits in this apparatus, together with the manner in which the dials are marked, enables the intermediate computations and any necessary compromises thereof to be effected in a rapid, easy fashion.

DETAILED DESCRIPTION

Having presented this general description of the invention and its attendant advantages, attention now will be given to the details of the illustrated embodiment. Following this detailed description, some typical examples of operation will be described.

Referring to Fig. 1, the date analyzer has a chassis 10 on which are mounted a carrying handle 11 and a control panel 12. Mounted behind individual sight openings in the control panel 12 are the dials 13 to 20, inclusive, which pertain respectively to the various parameters or constituent values of the problems that are to be solved by the analyzer. The dials 13 to 20 are respectively connected to knurled wheels 23 to 30, which protrude through suitable slots in the panel 12. By manipulation of the wheels 23 to 30, the dials 13 to 20 may be set in accordance with the respective parameters designated in the legends beneath these wheels, Fig. 1.

The knurled wheels 23 to 30 also are coupled mechanically to the rotatable parts of certain variable resistors included in the Wheatstone bridge networks 31, 32 and 33, Fig. 2, which are located behind the panel 12. Thus, the wheels 23, 24 and 25 are coupled respectively to the variable resistors 36, 37 and 38 in the Wheatstone bridge 31. The wheels 25, 26, 27 and 28 are coupled respectively to the variable resistors 39, 40, 41 and 42 in the Wheatstone bridge 32. The wheels 28, 29 and 30 are coupled respectively to the variable resistors 43, 44 and 45 in the Wheatstone bridge 33.

It will be noted that the wheel 25 associated with the "r.p.m." dial 15, Fig. 1, controls the setting of the variable resistor 39 in the bridge network 32, Fig. 2, and at the same time it controls the setting of the variable resistor 38 in the bridge network 31. The reason for this concurrent adjustment feature is that the rotary speed of the work or cutter, in revolutions per minute, is one of the factors that determine the value of the "feed rate," as explained above in the "General description." That is to say, the end product (r.p.m.) of the computation performed by means of the first bridge network 31, Fig. 2, is a factor of the "feed rate" computation which is performed by means of the second bridge network 32, "feed rate" being equal to rotary speed times chip load times number of teeth.

Similarly, the wheel 28 associated with the "feed rate" dial 18, Fig. 1, concurrently adjusts the variable resistor 42 in the bridge network 32, Fig. 2, and the variable resistor 43 in the bridge network 33. This is because the end product (feed rate) of the computation performed by means of the second bridge network 32 is a factor of the "time" computation performed by means of the third bridge network 33, "time" being equal to the length of cut divided by the feed rate.

Fig. 3 illustrates the manner in which a single knurled wheel such as the wheel 25 (Fig. 2) may be utilized to adjust two resistors such as 38 and 39 concurrently. Current is supplied to the respective resistance windings by way of the arcuate contacts 46 and 47 and the rotatable contact arms 48 and 49, which are adapted to have wiping engagement with the contacts 46 and 47 and the respective resistance windings. The conducting arms 48 and 49 are in insulated relation to each other and are actuated in unison by the shaft 50 of the resistor assembly (indicated schematically by a dot-dash line) which in turn is connected mechanically to the wheel 25 by means not shown. A similar arrangement exists in the case of the wheel 28 and the resistors 42 and 43, Fig. 2.

The bridge networks 31, 32 and 33, Fig. 2, are respectively provided with balance indicators 51, 52 and 53 in the form of galvanometers. These galvanometers 51, 52 and 53, as shown in Fig. 1, are mounted on the control panel 12 adjacent to the knurled wheels of the respective bridges. As each bridge network is brought into balance by manipulation of its variable resistors, the associated indicator registers a null in the familiar manner. Both coarse and fine adjustments are provided. For example, in the case of the galvanometer 51, a switch 55 (Figs. 1 and 4) is closed to connect a shunt 56 across the galvanometer 51 for coarse adjustment of the bridge 31. For fine adjustment the switch 55 is opened, thereby removing the shunt 56 from the galvanometer circuit.

All of the dial assemblies 13 to 20 on the control panel 12, Fig. 1, have essentially the same basic construction. Certain of these dials, however, are provided with additional features which constitute an important part of the present invention, and for that reason special attention will be given to them. Fig. 5 illustrates a proposed form of dial construction having a special purpose. Referring to this figure, the dial 15 has a sight opening which is covered by a transparent window 60 whereon a horizontal reference mark or hairline 1 is located. When the wheel 25 is turned, the numbers of the dial 15 move past the reference line 61. As mentioned above, the bridge 31 (Fig. 2) is brought into balance by manipulating the various wheels 23, 24, and 25 in accordance with the values of the respective factors until a null condition is registered by the indicator 51. When this condition of balance is achieved, the theoretical value of the r.p.m. will be indicated by the dial value directly opposite the reference line 61, Fig. 5. If this indicated value does not coincide with one of the standard r.p.m. settings of the particular machine tool under consideration, the setting of the dial 15 then must be readjusted in the manner explained below.

First it will be noted that an index point 62, Fig. 5, is located on the window 60 a given distance above the reference line 61. The dial numerals are arranged on the dial 15 in ascending order, progressing upwardly from the lower end of the sight opening, and they are spaced in logarithmic fashion on the periphery of the dial 15. The vertical distance between the index point 62 and the reference line 61 is such that the point 62 always indicates a value on the dial 15 which is greater by a given percentage than the value indicated by the line 61. This denotes an acceptable range of tolerance or deviation. A variation of 15%, for example, commonly is regarded as permissible. Thus, if the quantity "80" is registered at the line 61, the point 62 will indicate the dial value "92," which is 15% greater than "80."

If the first setting of the dial 15 does not indicate an r.p.m. value corresponding to one of the standard speeds for the given machine tool, the operator then looks on the dial 15 for a value lying within the 15% range between the line 61 and point 62 which does correspond to a standard speed. Upon locating such a value, he resets the dial 15 to bring this standard value on the dial 15 into alignment with the reference mark 61. In this way, the actual r.p.m. value is slightly increased over the theoretical r.p.m. value computed by the initial setting of the bridge 31. One usually prefers a slightly higher r.p.m. setting because it tends to increase the output of the machine.

In the initial setting of the dial 15, the index point 62 marks the safe upper limit to which good machining practice will permit the rotary speed of the machine to be increased without making the surface speed between the cutter and the work excessive. A range of 15% commonly is allowed, but of course this can be varied to suit the particular conditions. When the dial 15 is reset to another value within the permissible range, the first bridge network is unbalanced slightly, causing the indicator 51, Fig. 1, to register "over." The corrected value of r.p.m. automatiically is introduced into the second bridge network 32, Fig. 2, by reason of the fact that the resistor 39 is controlled by the wheel 25 which operates the r.p.m. dial 15. The "over" indication signifies that the corrected value is higher than the theoretical or recommended value.

If the acceptable range of values above the recommended value does not include an available r.p.m. setting for the given machine tool, then one may have to select an available r.p.m. which is below the value first indicated by the dial 15. There is, of course, no lower limit to the rotary speed, except that from a standpoint of efficiency one ordinarily would select the value which is nearest the original indicated value. In this instance the dial 51, Fig. 1, will register "under" when the dial 15 has been reset. This is useful as indicating a condition in which one may want to vary other factors such as the size or type of cutter in order to offset the loss of speed.

Fig. 6 illustrates the manner in which the window 65 of the "feed rate" dial 18 may be arranged to indicate, for example, a 15% adjustment tolerance. The dot 67 and the reference line 66 on the window 65 respectively denote the upper and lower limits of this 15% range. Where the feed rates of the machine tool are calibrated in inches per minute, and the value appearing at the line 66 does not coincide with one of the available feed rates, the operator looks on the dial 18 for an appropriate value of feed rate lying between the line 66 and dot 67. Having found this value, he resets the dial 18 accordingly so that the selected value registers with the line 66. This increase in the feed rate will effect a corresponding increase in chip load, but within the allowable predetermined limit.

Indicator 52, Fig. 1, will register "over" if a higher-than-recommended (but permissible) value of feed rate is selected, and "under" if a lower feed rate is chosen. Thus, the indicator 52 denotes the manner in which various factors may have to be changed under some conditions in order to attain the recommended feed rate.

The "feed rates," so called, of some machine tools actually are calibrated in terms of chip load (inches per revolution per tooth). This requires a special procedure when working with the second bridge. If one desires to apply the same range of variation to chip load and feed rate alike, he can utilize the markings of the feed rate dial window 65 (Fig. 6) to readjust the chip load dial 17 (Fig. 1) in case the indicated chip load is not available in the given machine tool. Thus, an available chip load is selected, and dial 17 is reset to that value. Dial 18 then is reset until the bridge balance is restored (indicator 52), and the new value of feed rate is noted to determine whether it came within the permissible range established by the initial setting. If not, the process then must be repeated with a different selected value of chip load.

It would be within the purview of the invention to provide the chip load dial 17, Fig. 1, with limit indicia similar to those of the dials 15 and 18, Figs. 5 and 6. In practice, however, this has been found to be unnecessary, and in fact, it is preferable to omit such indicia from the dial 17 to eliminate any possibility of confusion as to which indicia should be employed in a given situation.

While the limit indicia associated with dials 15 and 18 are shown as fixed indicia in Figs. 5 and 6, it would be feasible and in some instances may be preferable to employ adjustable indicia such as 69, Fig. 7. Here a pointer or index member 69 is arranged to slide along a stationary scale 68 mounted along one side of the sight opening 65a. Parts which correspond to one another in Figs. 6 and 7 are numbered alike except for the suffix "a" in Fig. 7. The index 69 may occupy any desired position along its scale 68, being illustrated in its "15%" position.

As previously mentioned, the feed rate value registered on the dial 18 is introduced automatically into the bridge network 33, Fig. 2, as a factor of the final computation by means of the variable resistor 43. The dial 19 is set according to the length of cut (including approach and overtravel), and the dial 20 is adjusted to obtain a balance as indicated by a null or zero reading of the galvanometer 53. The reading of the dial 20 indicates the amount of time required by the machine to perform the specified cut with optimum settings of r.p.m., feed rate and/or chip load.

While the functions of the analyzer have been described thus far on the assumption that the dials 13 to 20, Fig. 1, will be operated in left-to-right sequence, there may be variations of this procedure. For instance, one may start with a predetermined value of time set up on the dial 20 and then work backward to find the optimum r.p.m. and feed rate settings of the machine which will be consistent with recommended speeds and feeds.

OPERATION

The following description of operation will deal with two typical examples. One of these relates to a lathe turning operation and the other to a shell milling operation. The analyzer is adapted to handle problems relating to other machine tool operations as well without departing from the principles of the invention, although in some cases it may become necessary to modify the various legends associated with the dials of the disclosed apparatus in order to handle the mathematical relationships which are involved in a particular problem.

It is assumed, of course, that the person operating the analyzer will have access to the necessary books, tables or charts containing the information which is pertinent to his problem. He will need to know, for example, the recommended surface speeds and chip loads for specified machining operations performed upon various given materials under the different conditions that are likely to be encountered in practice. The available speeds and feed rates of standard machine tools usually are known or can easily be obtained. The local shop practice, insofar as it affects the parameters of the problem, also must be taken into consideration.

The analyzer is placed in operation by closing the switch 70, Figs. 1 and 2, thereby illuminating the dial lamp 71. In the first phase of the analyzing operation the dials 13, 14 and 15 are manipulated by means of the wheels 23, 24 and 25 to bring about a balanced condition of the first bridge network, as indicated by a zero reading of the galvanometer 51. Then the dials 16, 17 and 18 are manipulated to balance the second bridge network, which condition is indicated by a zero reading of the galvanometer 52. Dials 19 and 20 then are set to balance the third bridge network, as indicated by the reading of the galvanometer 53. In each instance a coarse adjustment of the respective bridge is made while the appropriate galvanometer switch (such as 55) is in one of its two positions, and a fine adjustment then is made with the galvanometer switch in its other position. The settings of certain dials (15, 18) may be corrected where necessary to conform with standard speeds and feed rates, as already explained. The "time" value computed by the analyzer is read from the dial 20.

Lathe turning

The first example will be to find the rotary speed in revolutions per minute (r.p.m.), the feed rate and the amount of time required to perform the following work: Turn a round bar of AISI No. 303 stainless steel from a 1-inch diameter to a 0.950 inch diameter for a length of 1½ inches, using a single point, high speed steel tool bit with a 0.030-inch radius at the cutting point. A single finish cut is to be made in the stock. Surface finish required is 63 micro-inches. The machine to be employed will be a Warner and Swasey No. 3 turret lathe.

By referring to a table of recommended surface speeds, one finds that 120 feet per minute is the recommended surface speed for AISI No. 303 stainless steel when a high speed steel tool is being used to perform a finish cut. Having obtained this information, the person operating the data analyzer then sets dial 13 (Fig. 1) at "120." Inasmuch as the work is initially one inch in diameter, the dial 14 is set at "1." The r.p.m. dial 15 now is turned until the galvanometer 51 registers zero, indicating a balanced condition of the first bridge network. The dial 15 thereupon indicates an r.p.m. of "460."

Reference now is made to a book or table of the salient r.p.m. values for the nearest actual r.p.m. setting which is available in a Warner and Swasey No. 3 turret lathe. It so happens that 460 r.p.m. is one of the standard speed settings available in this particular machine tool. Therefore, the operator is not required in this instance to alter the setting of the r.p.m. dial 15.

Since a lathe utilizes a single-tooth cutter, the operator sets the dial 16 (Fig. 1) at "1." Then by referring to a standard table of recommended chip loads, he selects a suitable chip load value for AISI No. 303 stainless steel having a 63 micro-inch surface finish with a tool radius of 0.030 inch, provided the table is set up in that particular manner. The recommended value in this case is 0.0015 inch per revolution per tooth.

Standard reference tables may be set up in various ways, and in some cases the above described procedure may have to be modified slightly according to the form of table which one is using. For instance, some persons prefer to compile data of this type with reference to power factors instead of surface finishes and tool radii. It will be assumed for the present that regardless of the manner in which this may be determined, the recommended chip load value will be 0.0015.

Inasmuch as the "feed rate" settings of turret lathes commonly are calibrated in inches per revolution (actually corresponding to "chip load" as the term is used herein), the operator now refers to a table of salient feed rates for a Warner and Swasey No. 3 turret lathe. He will find that 0.0015 inch per revolution is one of the available "feed rates" (i.e., chip loads); hence the "chip load" dial 17 is set to this value and is not moved thereafter. Then the operator brings the second bridge network into balance by manipulating the dial 18 until the indicator 52 registers zero. The feed rate indicated on the dial 18 under the assumed conditions will be 0.69 inch per minute.

If the recommended chip load had differed from the nearest practical value, the operator would have to determine whether the practical value was within the permissible range of deviation. This could be done in the manner previously explained herein, by utilizing the indicia of the dial 18 (Fig. 6).

To complete the solution of the problem, the operator sets the dial 19 in accordance with the particular length of cut (total travel) involved, which in this case is 1½ inches. The third galvanometer 53 then is balanced to zero by turning the "time" dial 20. The final result of the computation, 2.17 minutes, is registered by the dial 20 when this final balance has been achieved.

In this problem it was assumed that the r.p.m. and chip load values determined in the first instance were identical with practical values of r.p.m. and chip load for the specified machine tool. If this had not been true, adjustments would have had to be made by resetting certain dials, as already explained. In the current example these additional analytical functions were not required, and the instrument was utilized as a straight calculator rather than as an "analyzer," properly so called.

The adjustable index of Fig. 7 may be substituted for the fixed index of Fig. 5 and/or Fig. 6 if desired. This type of index also could be utilized in conjunction with the "chip load" dial as suggested hereinabove.

*Milling*

This example will deal with a situation in which corrective adjustments of both the r.p.m. and feed rate dials are required, thereby utilizing the analytical capacity of the instrument. It will be assumed that one wishes to determine the r.p.m. and feed rate settings and the amount of time required to perform the following work: Shell mill a piece of AISI No. 416 which is 4 inches long by 2½ inches wide from a thickness of ½ inch to a thickness of 0.437 inch in one finish cut. The machine to be employed is a Cincinnati No. 2 vertical milling machine. The cutting tool will be a shell end mill of high speed steel, three inches in diameter and having ten teeth with a 0.010 inch radius ground on the cutting points. The surface finish required is 125 micro-inches.

Referring to a table of recommended surface speed for the specified milling operation on AISI No. 416 stainless steel using a high speed steel cutter, one will find that 110 feet per minute is the recommended surface speed for a finish milling cut. The surface speed dial 13, Fig. 1, accordingly is set at "110." The dial 14 is set at "3" to indicate a 3-inch cutter. Then the r.p.m. dial 15 is turned until the first galvanometer 51 registers zero. The indicated r.p.m. value is "140."

Now referring to a table of machine tool speeds the operator will find that the nearest actual r.p.m. setting available on a Cincinnati No. 2 vertical milling machine is "152." With the dial 15 occupying the position just described, wherein its reading is "140," it will be seen that the value "152" on this dial lies within the permissible 15% range (assuming this to be the acceptable variation) denoted by the dot 62 on the dial window 60, Fig. 5. Therefore, the operator will reset the dial 15 so that it reads "152."

The dial 16 is set at "10" for a ten tooth cutter. The operator then refers to a table of recommended chip load values for AISI No. 416 stainless steel, shell mill, with surface finish in the range 63-125 micro-inches and tool radius of 0.010 inch, and finds 0.006 inch per revolution per tooth as the recommended chip load. The chip load dial 17 therefore is set at 0.006. It will be noted that in the present case there is no need to readjust the chip load dial 17 because this type of machine tool is not calibrated according to chip load settings.

It has been assumed that the standard table of recommended chip loads will have been assembled with reference to surface finish requirements and tool radii. As pointed out previously, a different type of table may be employed in which emphasis is placed upon other parameters instead, but in one way or another the operation will arrive at a recommended chip load value to which the dial 17 may be adjusted.

Having performed the steps just described, the operator balances the second galvanometer to zero by manipulating the feed rate dial 18. The ostensible feed rate now indicated by dial 18 is 9.12 inches per minute. Referring to the appropriate table of feed rates, it is found that the nearest longitudinal feed rate available in a Cincinnati No. 2 vertical milling machine is "9.25." With the feed rate dial 18 set at "9.12" (the ostensible value), the value 9.25 is found to lie within an assumed permissible 15% range denoted by dot 67, Fig. 6, on the dial window 65. The operator accordingly resets the dial 18 to indicate "9.25."

If preferred, the type of adjustable index shown in Fig. 7 may be substituted for either or both of the fixed indicia associated with the r.p.m. and feed rate dials. This will enable one to select the percentage variation from recommended values which will be considered acceptable.

The length of cut being 4 inches, the dial 19 is set at "4." The galvanometer 53 then is balanced to zero by turning the time dial 20. The computed time, 0.44 minute, is read on the dial 20. The amount of approach and overtravel should be included in the length of cut if total time is required.

Thus, to perform the specified milling operation, the above-mentioned milling machine should be set for 152 r.p.m. with a longitudinal feed rate of 9.25 inches per minute, and it will perform the operation in 0.44 minute.

*Other operations*

If the analyzer is to be used in other machining operations such as grinding, broaching, planing and the like, different legends may be associated with various dials, and special procedures may be adopted for operating the instrument. For example, in grinding problems the dials normally designated "number of teeth" and "chip load per tooth per revolution" would be designated in accordance with the analogous constants or parameters relating to the character of the grinding surface. In planing operations, since all motions are rectilinear, the rotary speed dial could not be used in the normal manner but would have to be set in a predetermined relationship to the surface speed dial dependent upon, say, the width of the work.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

The invention is claimed as follows:

1. A data analyzing apparatus for determining an optimum relationship among various parameters, some of which have recommended values that under certain conditions may differ from values which are feasible in practice, comprising a plurality of electrical bridge networks each having a plurality of variable resistors included in two adjacent arms, each arm being in a different branch of said bridge networks, resistances of predetermined value in the remaining two arms of each bridge, each of said variable resistors having a portion thereof settable to represent a selected value of a given parameter, dials respectively connected to the settable portions of certain variable resistors for indicating the individual parametric values represented by the resistor settings, a common dial marked according to a logarithmic scale connected to variable resistors in at least two different bridge networks, a reference line positioned to indicate the setting of said common dial, a scale fixed relative to said reference line, and an index member positioned to move over said scale and settable to indicate an extreme permissible deviation of said common dial if the recommended value is not a feasible one.

2. A data analyzing apparatus for determining an optimum relationship among various parameters some of which have recommended values that under certain conditions may differ from values which are feasible in practice comprising a plurality of electrical bridge networks each having a plurality of variable resistors included in two adjacent arms, each arm being in a different branch of said bridge network, resistances of predetermined value in the remaining two arms of each bridge, each of said variable resistors having a portion thereof settable to represent a selected value of a given parameter, dials respectively connected to the settable portions of certain variable resistors for indicating the individual parametric values represented by the resistor settings, a common dial marked according to a logarithmic scale connected to variable resistors in at least two different bridge networks, a reference mark positioned to indicate the setting of said common dial, and an index member positioned to move relative to said reference mark and settable to indicate an extreme permissible deviation of said common dial if the recommended value is not a feasible one.

3. A data analyzing apparatus for determining an optimum relationship among various parameters some of which have recommended values that under certain conditions may differ from values which are feasible in practice comprising a plurality of electrical bridge networks each having a plurality of variable resistors included in two adjacent arms, each arm being in a different branch of said bridge network, resistances of predetermined value in the remaining two arms of each bridge, each of said variable resistors having a portion thereof settable to represent a selected value of a given parameter, dials respectively connected to the settable portions of certain variable resistors for indicating the individual parametric value represented by the resistor settings, a common dial marked according to a logarithmic scale connected to variable resistors in at least two different bridge networks, a reference mark positioned to indicate the setting of said common dial, an arithmetic stationary scale fixed relative to said reference line, and an index member positioned to move over said arithmetic stationary scale and settable to indicate an extreme permissible deviation of said common dial if the recommended value is not a feasible one.

References Cited in the file of this patent

UNITED STATES PATENTS

| | | |
|---|---|---|
| 1,573,850 | Naiman | Feb. 23, 1926 |
| 2,076,242 | Marquis | Apr. 6, 1937 |
| 2,431,696 | Keister | Dec. 2, 1947 |
| 2,502,300 | Young | Mar. 28, 1950 |

FOREIGN PATENTS

| | | |
|---|---|---|
| 625,023 | Great Britain | June 21, 1949 |